United States Patent
Hosogane et al.

(10) Patent No.: US 8,663,727 B2
(45) Date of Patent: Mar. 4, 2014

(54) METHOD OF MOLDING COOKED RICE

(75) Inventors: Takashi Hosogane, Machida (JP);
Atsushi Numabe, Machida (JP)

(73) Assignee: Kabushiki Kaisha Audio-Technica, Machida-shi (JP)

( * ) Notice: Subject to any disclaimer, the term of this patent is extended or adjusted under 35 U.S.C. 154(b) by 0 days.

(21) Appl. No.: 13/437,500

(22) Filed: Apr. 2, 2012

(65) Prior Publication Data

US 2012/0189749 A1    Jul. 26, 2012

Related U.S. Application Data

(62) Division of application No. 12/461,312, filed on Aug. 7, 2009, now abandoned.

(30) Foreign Application Priority Data

Aug. 20, 2008    (JP) .................. 2008-211486

(51) Int. Cl.
| | |
|---|---|
| A23G 3/02 | (2006.01) |
| A21D 13/00 | (2006.01) |
| A23G 1/22 | (2006.01) |
| A01J 25/12 | (2006.01) |
| A01J 21/00 | (2006.01) |
| A21C 3/00 | (2006.01) |
| A23B 4/052 | (2006.01) |
| A47J 37/12 | (2006.01) |
| A21C 9/04 | (2006.01) |
| A23P 1/00 | (2006.01) |
| A21C 9/06 | (2006.01) |

(52) U.S. Cl.
USPC ........... 426/512; 426/514; 426/389; 425/112; 425/383; 425/328; 425/343; 425/363; 99/352; 99/353; 99/450.1; 99/450.2; 99/450.6; 99/450.7

(58) Field of Classification Search
USPC ......... 426/501, 502, 512, 514, 389, 414, 443, 426/452, 453, 454, 549, 615, 618, 629; 425/112, 383, 346 R, 308, 328, 298, 425/343, 204, 363; 99/352–353, 99/450.1–450.7, 494
See application file for complete search history.

(56) References Cited

U.S. PATENT DOCUMENTS

| 5,870,948 A | * | 2/1999 | Ono .......................... 99/450.6 |
| 7,581,940 B2 | * | 9/2009 | Hosogane et al. ......... 425/324.1 |
| 2005/0016389 A1 | * | 1/2005 | Kobayashi .................. 99/450.1 |

FOREIGN PATENT DOCUMENTS

| JP | H06-31487 U | 4/1994 | |
| JP | H06-55387 U | 8/1994 | |
| JP | H 10179062 A | * 7/1998 | ............... A23L 1/10 |
| JP | 2002-045129 A | 2/2002 | |
| JP | 2007053914 A | * 3/2007 | |

OTHER PUBLICATIONS

Machine translation of JPH 10179062 A.* Machine translation of JP2007053914 A.*

* cited by examiner

*Primary Examiner* — Rena Dye
*Assistant Examiner* — Danny Chen
(74) *Attorney, Agent, or Firm* — Manabu Kanesaka

(57) ABSTRACT

A cooked rice molding method includes a first supplying step of spreading cooked rice in a plate form on rolling-up plates deployed horizontally, a second supplying step of placing a dried laver sheet and ingredients on the cooked rice, a first pressing step of folding a first rotating plate and a second rotating plate disposed on two sides of a base plate in a direction to erect at approximate right angles with respect to the base plate, and a second pressing step of folding the third rotating plate rotatably attached to the first rotating plate at a side opposite to the base plate, to a base plate side. Then, the method includes a repositioning step of deploying the rolling-up plates in the horizontal state, and rotating the cooked rice about 90 degrees on the rolling-up bamboo plate. Finally, the first pressing step is repeated again.

8 Claims, 5 Drawing Sheets

METHOD OF MOLDING COOKED RICE

CROSS-REFERENCE TO RELATED APPLICATION

This is a divisional application of patent application Ser. No. 12/461,312 filed on Aug. 7, 2009. The present application is based on, and claims priority from, Japanese Application No. JP2008-211486, filed Aug. 20, 2008, the disclosure of which is hereby incorporated by reference herein in its entirety.

TECHNICAL FIELD

The present invention relates to a method of molding cooked rice for making rolled sushi, and more particularly, to a method of molding cooked rice for making back rolled sushi that is rolled up with sushi rice, or rice seasoned with vinegar, directed outside.

BACKGROUND ART

To produce rolled sushi mechanically, there has been proposed a cooked rice molding apparatus as disclosed in Japanese Patent Application Publication No. 2002-45129. In this cooked rice molding apparatus, after rice seasoned with vinegar (hereinafter, referred to as sushi rice) supplied from a hopper has been spread over a dried laver sheet placed on a rolling-up bamboo plate while being rolled into a plate shape by a rolling section, the sushi rice is rolled by the dried laver sheet into a rod shape by deforming the rolling-up bamboo plate into a cylindrical shape.

In Japanese Patent Application Publication No. 2002-45129, the rolling-up bamboo plate includes four plate members, and these plate members are connected to each other rotatably. Thereby, the rolling-up bamboo plate is deformed into a cylindrical shape by bringing both ends of the plate members close to each other from the state in which the plate members are developed horizontally.

The rolled sushi is of several kinds, and one of them is rolled sushi called "back rolled sushi". The back rolled sushi is generally rolled sushi that is rolled so that sushi rice is directed to the outside with respect to a dried laver sheet, and is especially popular as a California roll in foreign countries because the dried laver sheet does not come out to the surface. Incidentally, there is available a method in which back rolled sushi is made without the use of dried laver sheet.

Thereupon, in producing the back rolled sushi by using the aforementioned cooked rice molding apparatus, the process is merely such that, first, sushi rice is spread over the rolling-up bamboo plate, then a dried laver sheet being placed on the sushi rice, and thereafter the sushi rice is rolled together with ingredients by the rolling-up bamboo plate.

Unfortunately, when back rolled sushi is made by the conventional cooked rice molding apparatus, there arises a problem as described below. The conventional rolling-up bamboo plate has been composed of four plate members having almost the same width, and a cylindrical space for rolling up sushi rice therein has been formed by bringing both ends of the plate members close to each other.

Therefore, when sushi rice is spread over the conventional rolling-up bamboo plate, a dried laver sheet is placed on the sushi rice, and ingredients are placed on the dried laver sheet, whereby rolling is performed, a force for fixing grains of sushi rice to each other is weak because the sushi rice is arranged on the outside of the dried laver sheet, so that the back rolled sushi is disintegrated easily merely by being held by hand.

Also, since the dried laver sheet is arranged so as to wrap the ingredients, the ingredients are easy to move, and therefore the ingredients sometimes move at the moment when the back rolled sushi is shaped. Therefore, to make back rolled sushi so as not to disintegrate, it is necessary to roll sushi rice in a spiral form together with a dried laver sheet.

The present invention has been made to solve the above problems, and accordingly an object thereof is to provide a cooked rice molding apparatus capable of efficiently making back rolled sushi in which sushi rice is arranged so as to be directed to the surface side.

SUMMARY OF THE INVENTION

To achieve the above object, the present invention has some features described below. In a cooked rice molding apparatus including a rolling-up bamboo plate formed by rotatably connecting a plurality of plate-shaped pieces, and configured so as to mold cooked rice spread on the rolling-up bamboo plate into a rod shape together with dried laver and ingredients by bringing both ends of the rolling-up bamboo plate close to each other, a gap allowing some of the cooked rice to be pulled out to the outside when both ends of the rolling-up bamboo plate have been brought close to each other is provided in the abutting portion of the rolling-up bamboo plate.

According to this feature, because the gap allowing some of the cooked rice to be pulled out to the outside is provided in the abutting portion of the rolling-up bamboo plate, sushi rice is allowed to escape through the gap, so that the sushi rice is not cut, and back rolled sushi can be made reliably.

As a preferred aspect, the rolling-up bamboo plate includes a base plate, first and second rotating plates one end of which is rotatably connected to both ends of the base plate, and a third rotating plate rotatably connected to the other end of the first rotating plate, and the third rotating plate is formed so that the width thereof is narrower than the width of the base plate.

According to this feature, because the third rotating plate is formed so that the width thereof is narrower than the width of the base plate, the gap is formed in the abutting portion of the rolling-up bamboo plate, so that the sushi rice can be pulled out through the gap.

As a preferred aspect, the second rotating plate is formed so that the width thereof is wider than the width of the first rotating plate.

According to this feature, because the second rotating plate is formed so that the width thereof is wider than the width of the first rotating plate, the tip end portion of the second rotating plate can hold the sushi rice pulled out through the gap.

Also, the present invention embraces a cooked rice molding method. A cooked rice molding method uses the cooked rice molding apparatus including the rolling-up bamboo plate formed by rotatably connecting the plurality of plate-shaped pieces, and configured so as to mold cooked rice spread on the rolling-up bamboo plate into a rod shape together with dried laver and ingredients by bringing both ends of the rolling-up bamboo plate close to each other, the rolling-up bamboo plate including the base plate, the first and second rotating plates one end of which is rotatably connected to both ends of the base plate, and the third rotating plate rotatably connected to the other end of the first rotating plate and formed so that the width thereof is narrower than the width of the base plate, and including a supplying step of spreading cooked rice in a plate form on the rolling-up bamboo plate in a state in which the rolling-up bamboo plate is deployed horizontally, and placing a dried laver sheet and ingredients on the cooked rice; a first pressing step of folding the first rotating plate and the second rotating plate in the direction such that these rotating plates are brought close to each other to erect these rotating plates at approximate right angles from both ends of the base plate; and a second pressing step of folding the third rotating plate to the base plate side.

Preferably, the cooked rice molding method further includes a repositioning step of deploying the rolling-up bamboo plate in the horizontal state and then repositioning the cooked rice molded in the second pressing step due to the cooked rice being rotated through about 90 degrees on the rolling-up bamboo plate, and a third pressing step of performing the first pressing step and the second pressing step again.

According to this feature, because the sushi rice is rolled in a spiral form, back rolled sushi that is less liable to disintegrate can be mass produced mechanically.

DETAILED DESCRIPTION

Figure 1:
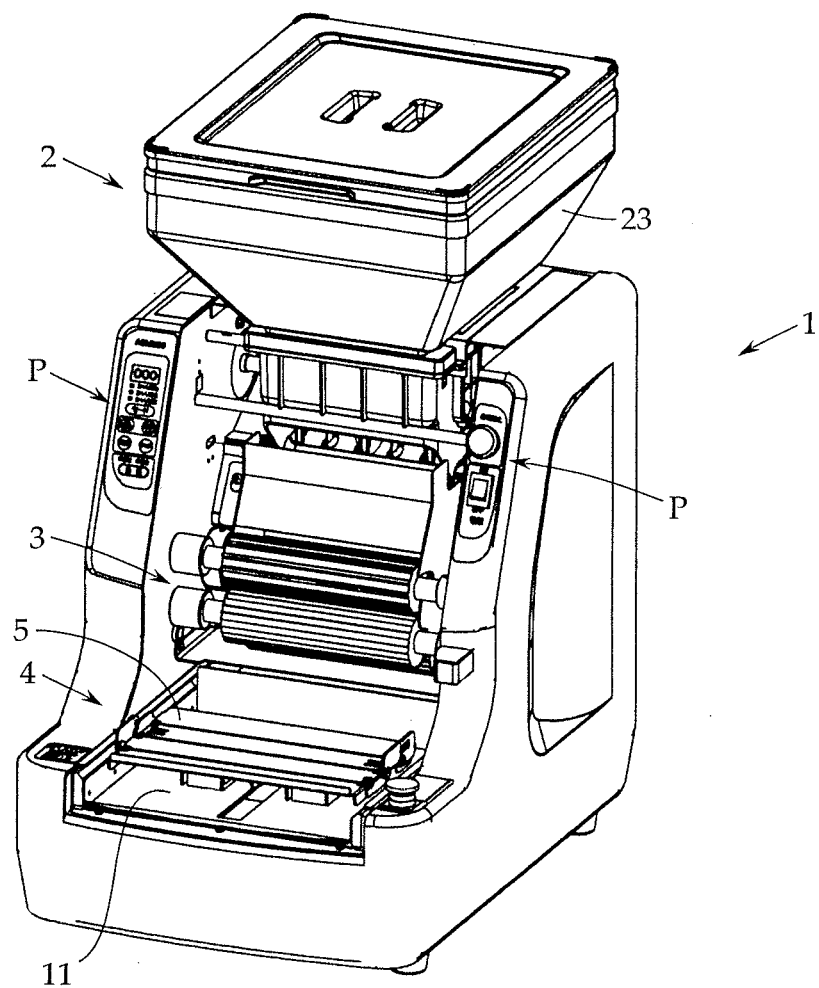
FIG. 1 is a perspective view of a cooked rice molding apparatus in accordance with one embodiment of the present invention.
Figure 3:
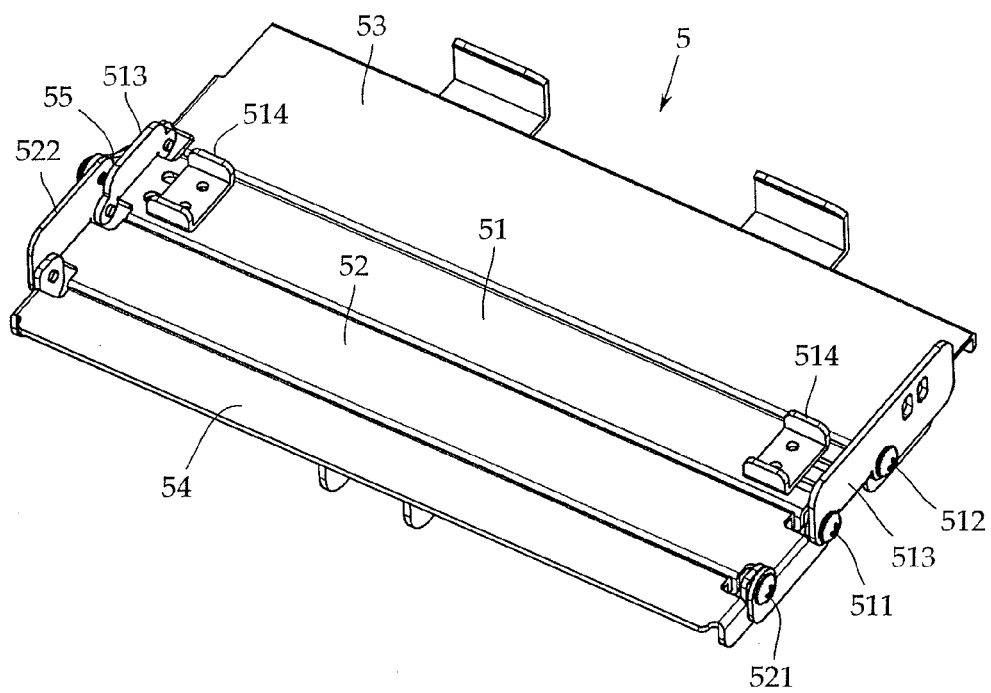
FIG. 3 is a perspective view of a rolling-up bamboo plate.
Figure 4A:
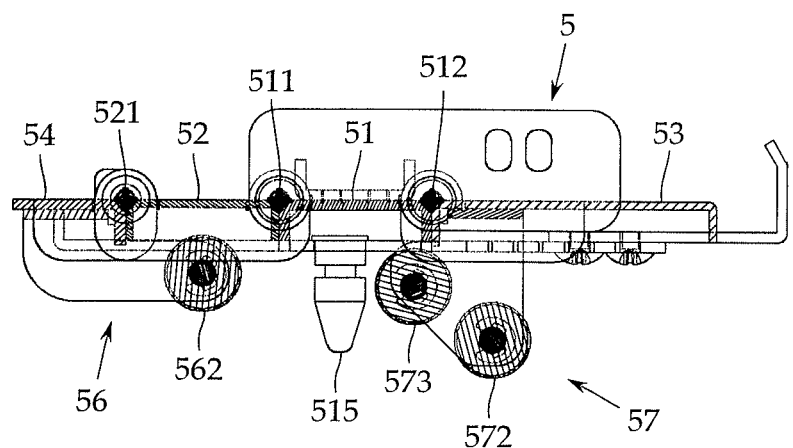
FIG. 4A is a sectional view of the rolling-up bamboo plate.
Figure 4B:
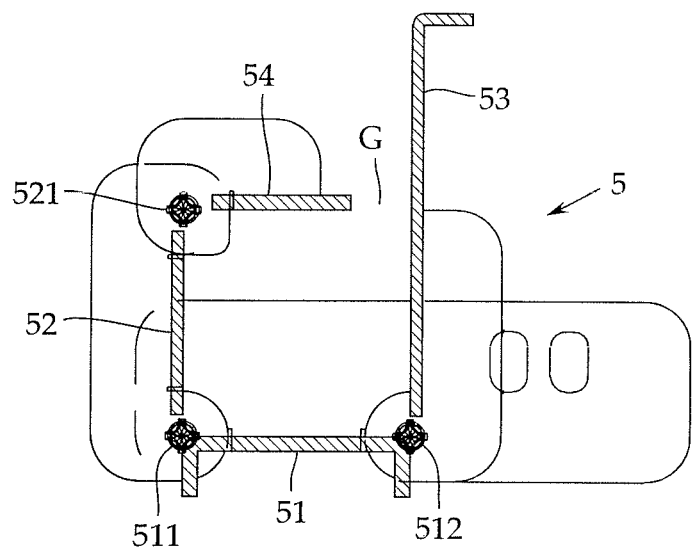
FIG. 4B is a sectional view showing a state in which the rolling-up bamboo plate is folded.

An embodiment of the present invention will now be described with reference to the accompanying drawings. FIG. 1 is a perspective view of a cooked rice molding apparatus in accordance with one embodiment of the present invention, FIG. 2 is a sectional view showing the internal construction of the cooked rice molding apparatus, FIG. 3 is a perspective view of a rolling-up bamboo plate, FIG. 4A is a transverse sectional view of the rolling-up bamboo plate, FIG. 4B is a sectional view showing a state in which the rolling-up bamboo plate is folded, and FIGS. 5A to 5F are schematic views showing rolled sushi molding steps performed by using the cooked rice molding apparatus in accordance with the present invention.

In FIG. 1, a front panel is removed so that the internal construction can be seen easily. In actuality, however, the front panel is attached so that a rolling section 3 and the like cannot be seen.

Figure 2:
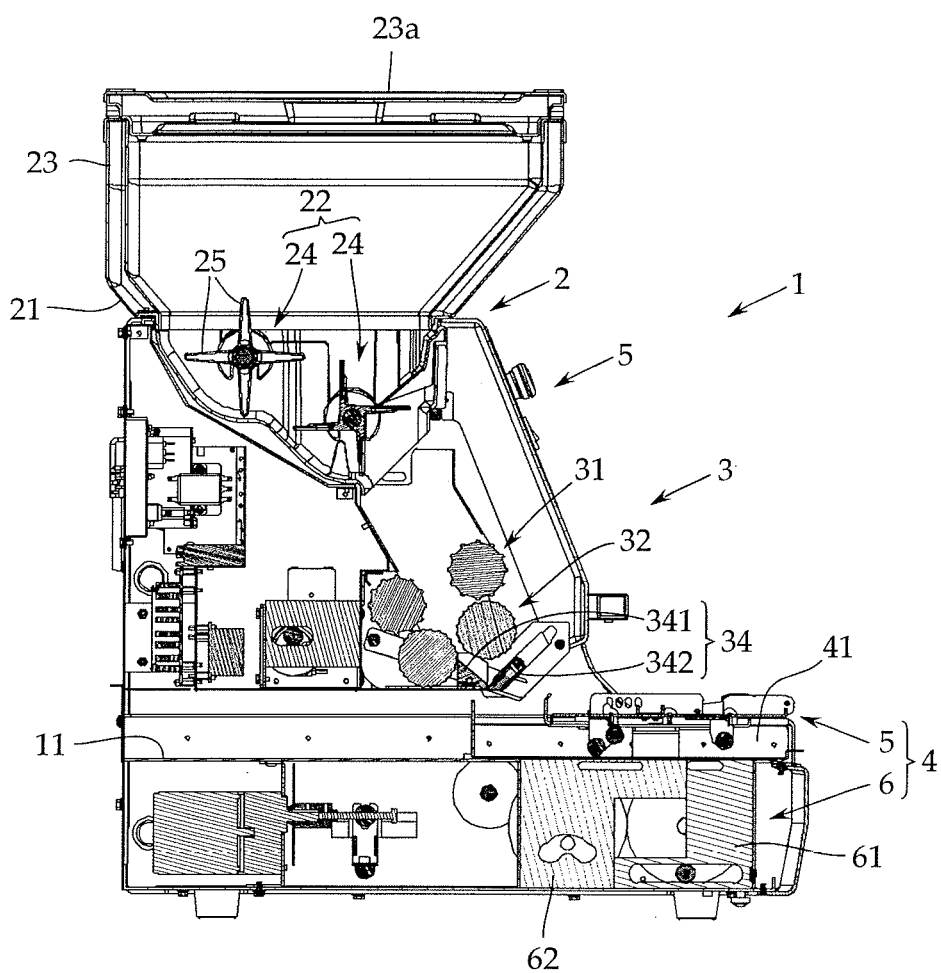
FIG. 2 is a sectional view showing the internal construction of the cooked rice molding apparatus shown in FIG. 1.

As shown in FIGS. 1 and 2, this cooked rice molding apparatus 1 includes a hopper 2 into which sushi rice is charged, the rolling section 3 in which the sushi rice supplied from the hopper 2 is rolled into a plate shape, and a molding section 4 in which the sushi rice having been rolled into a plate shape is molded into a rod shape.

On the front surface of the cooked rice molding apparatus 1, an operation panel P for operating the cooked rice molding apparatus 1 is provided. In this embodiment, the operation panel P is provided separately on both sides of the housing front surface. On the left-hand side as viewed from the front, various kinds of setting buttons for setting the supply amount of sushi rice, the number of molded rolled sushi, and the like and a display section are provided. On the right-hand side, a power switch, an emergency stop switch, and the like are provided. In the present invention, the configuration of the operation panel P is optional.

The hopper 2 is open toward the upper part of the apparatus main body, and includes a retaining part 21 in which sushi rice is retained and an agitation part 22 that causes the sushi rice retained in the retaining part 21 to forcedly flow to the downstream side while agitating the sushi rice. In the upper part of the cooked rice molding apparatus 1, a storage container 23 for supplying sushi rice to the hopper 2 is detachably provided.

The retaining part 21 is formed in a funnel shape whose volume decreases from the upside to the downside of the apparatus main body, and the downstream side thereof is open toward the rolling section 3, described later. The agitation part 22 has two agitation arms 24 that are rotationally driven via a driving means, not shown, and each of the agitation arms 24 is mounted with a plurality of agitation rods 25 arranged at predetermined intervals. In FIG. 2, the agitation arms 24 are rotated counterclockwise.

The rolling section 3 is a two-high rolling section having a top rolling roller pair 31 that is arranged on the outlet side of the hopper 2 and rolls the sushi rice supplied from the hopper 2 and a bottom rolling roller pair 32 that is arranged on the downstream side (delivery side) of the top rolling roller pair 31 and further rolls the sushi rice rolled by the top rolling roller pair 31. The top rolling roller pair 31 and the bottom rolling roller pair 32 are arranged parallel with each other.

On the downstream side of the bottom rolling roller pair 32, a cutting part 34 for cutting the rolled sushi rice to predetermined lengths is provided. The cutting part 34 includes a guide plate 341 that is provided adjacently to the outlet of the bottom rolling roller pair 32 and a cutting edge 342 that moves toward and away from the guide plate 341 via a driving means, not shown.

In the present invention, the specific configurations of the hopper 2 and the rolling section 3 are optional, and the shapes and the arrangements thereof can be changed optionally according to the specifications.

Referring to FIGS. 1 and 2, the cooked rice molding apparatus 1 includes a molding stage 11 for molding the sushi rice rolled through the rolling section 3 into a rod shape. The molding stage 11 is a horizontal stage arranged so as to pierce through the apparatus main body from the rear side of the cooked rice molding apparatus 1 to the front side thereof, and a part thereof is provided with the molding section 4.

The molding section 4 is provided with a slider 41 for sliding a rolling-up bamboo plate 5 back and forth along the molding stage 11, and the rolling-up bamboo plate 5 is fixed to the top surface of the slider 41. The moving means for the slider 41 may be a rack and pinion mechanism or a linear driving system.

Referring to FIGS. 3, 4A and 4B, the rolling-up bamboo plate 5 has a base plate 51 that is fixed to the slider 41, a first rotating plate 52 and a second rotating plate 53 that are rotatably connected to both ends of the base plate 51 via rotating shafts 511 and 512, and a third rotating plate 54 that is rotatably connected to the end portion of the first rotating plate 52 via a rotating shaft 521.

The base plate 51 consists of a metallic plate body whose surface is fluorinated, and side plates 513 are provided at both ends in the lengthwise direction (the vertical direction in FIG. 4) of the base plate 51. In both end portions of the top surface of the base plate 51, guide parts 514 are provided at a predetermined interval.

The guide parts 514 are guides for positioning at the time when a dried laver sheet is spread. The guide parts 514 are slidable to the right and left due to a screw, not shown, being loosened, so that the positions thereof can be changed so as to fit to the size of the dried laver sheet.

On the back surface (the lower surface in FIG. 4) of the base plate 51, a plurality of (two in this embodiment) locking convex parts 515, which are inserted in locking holes, not shown, provided in the slider 41, are provided at predetermined intervals.

The first rotating plate 52 consists of a metallic plate body whose surface is fluorinated, and is formed in a rectangular shape having almost the same size as that of the base plate 51. On one side face in the lengthwise direction of the first rotating plate 52 is provided a side plate 522, and one end of a link arm 55 is connected to the side plate 522.

The other end of the link arm 55 is connected to the side face of the second rotating plate 53 so that the second rotating plate 53 is folded up or deployed in response to the rotating motion of the first rotating plate 52.

The second rotating plate 53 consists of a metallic plate body whose surface is fluorinated, and one end thereof is connected to the base plate 51 via the rotating shaft 512, and the other end thereof is a free end that is raised almost vertically via the link arm 55.

As shown in FIG. 4B, the second rotating plate 53 formed so that the width thereof is wider than the width of the first rotating plate 52 opposed to the second rotating plate 53 with the base plate 51 being held therebetween so that the tip end thereof projects above the first rotating plate 52 in the state in which the first rotating plate 52 and the second rotating plate 53 are raised vertically.

On the back surface of the second rotating plate 53, a second cam member 57, which is pushed up by a second lift plate 62, described later, is formed integrally. On the tip end side of the second cam member 57, two cam rollers 572 and 573 that move along the second lift plate 62 are provided. One cam roller 572 is a resin-made roller, and is provided on the tip end side of the second cam member 57.

The other cam roller 573 is arranged on the root side of the second cam member 57, and consists of a magnetic body capable of being magnetically attracted to a magnet 72. In this embodiment, the second cam member 57 is arranged at two places at a predetermined interval in the lengthwise direction.

The third rotating plate 54 consists of a metallic plate body whose surface is fluorinated, and one end thereof is connected to the tip end of the first rotating plate 52 via the rotating shaft 521, and the other end thereof is folded to the upper part side of the base plate 51 via the link arm 55.

The third rotating plate 54 is formed so that the width thereof is narrower than the width of the base plate 51 opposed to the third rotating plate 54. Therefore, when the third rotating plate 54 is folded, a gap G (refer to FIG. 5D) for drawing out some of sushi rice is formed between the third rotating plate 54 and the second rotating plate 53.

On the back surface of the third rotating plate 54, a first cam member 56, which is pushed up by a first lift plate 61, described later, is formed integrally. On the tip end side of the first cam member 56, a cam roller 562 that moves along the first lift plate 61 is provided.

As shown in FIG. 2, a plate driving means 6 for folding the rolling-up bamboo plate 5 is provided within the apparatus main body under the molding stage 11. The plate driving means 6 includes the first lift plate 61 and the second lift plate 62 that move vertically toward the rolling-up bamboo plate 5 from the bottom surface of the molding stage 11 each via a driving motor, not shown.

The first lift plate 61 is arranged so as to face to the bottom part of the above-described third rotating plate 54 so that the first cam member 56 of the third rotating plate 54 is driven by the up and down movement of the first lift plate 61.

The second lift plate 62 is arranged so as to face to the back surface side of the above-described second rotating plate 53 so that the second cam member 57 of the second rotating plate 53 is driven by the up and down movement of the second lift plate 62.

In this embodiment, the rolling-up bamboo plate 5 is configured so as to be deformed from a flat plate shape into a tubular shape via the first lift plate 61 and the second lift plate 62. However, in the present invention, the deforming means for the rolling-up bamboo plate 5 is optional, and may be chosen optionally according to the specifications.

Next, one example of a procedure for using this cooked rice molding apparatus 1 is explained with reference to FIGS. 5A to 5F. First, due to the power switch provided on the operation panel P being turned on, the agitation arms 24 in the hopper 2 begin to rotate. Sushi rice R that has been prepared by mixing cooked rice with sushi vinegar beforehand is put into the hopper 2.

The sushi rice R put into the hopper 2 is supplied to the top rolling roller pair 31 of the rolling section 3 while being disintegrated by the agitation arms 24. Next, the operator operates the operation panel P to set the thickness and number of rolled sushi, and then depresses a start button.

When the start button is operated, a control section, not shown, gives a command to the rolling section 3 to rotate the top rolling roller pair 31 and the bottom rolling roller pair 32 in the delivery direction. The sushi rice R introduced into the rolling section 3 is first roughly rolled by the top rolling roller pair 31, being fed to the next bottom rolling roller pair 32, and is formed into a high-density plate-shaped object by the bottom rolling roller pair 32.

Simultaneously, the control section gives a command to the driving motor of the slider 41 of the molding stage 11, and causes the slider 41 to be on standby in the state in which the third rotating plate 54 of the rolling-up bamboo plate 5 is positioned under the rolling section 3.

When the sushi rice R is caused to flow forcedly from the downstream portion of the rolling section 3, the control section slides the rolling-up bamboo plate 5 forward (in the right direction in FIG. 2) in accordance with the flow velocity of the sushi rice R, and spreads the sushi rice R over the rolling-up bamboo plate 5. When a predetermined length of the sushi rice R is delivered, the control section pushes out the cutting edge 642 to cut the sushi rice R.

When the sushi rice R is supplied onto the rolling-up bamboo plate 5, the cooked rice molding apparatus 1 comes to a standby condition for a while. During this standby time, the operator puts a dried laver sheet S and ingredients F on the sushi rice R (supplying step). After the arrangement of the ingredients F has been completed, the operator depresses a rolling-up step start button, not shown, on the operation panel P. In place of depressing the rolling-up step start button, it is also possible to adopt timer control that accomplishes an automatic shift to the rolling-up step after the elapse of a given time following the finish of the rolling step.

When the rolling-up step starts, first, the control means ascertains again whether the rolling-up bamboo plate 5 is at a predetermined position on the plate driving means 6, and then gives a command to each driving motor of the plate driving means 6.

In response to this command, the first lift plate 61 and the second lift plate 62 are pushed up independently. When the first lift plate 61 moves up, the first cam member 56 of the third rotating plate 54 abuts against the top surface of the first lift plate 61 and is pushed up. As a result, the first rotating plate 52 and the third rotating plate 54 are raised while both keeping the horizontal state (first pressing step).

Figure 5A:
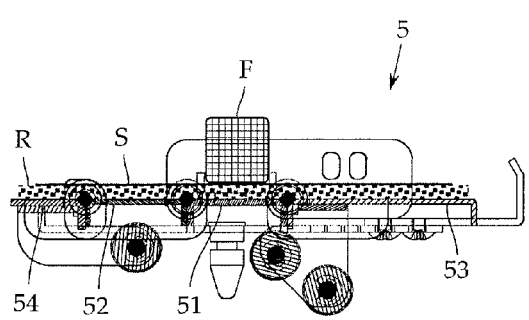
FIGS. 5A to 5F are explanatory views for explaining a rolled sushi molding process.
Figure 5B:
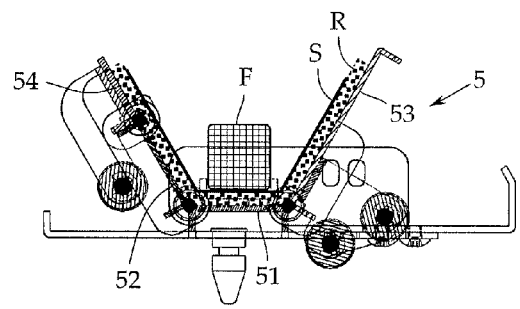

When the second lift plate 62 moves up, first, the cam roller 572 of the second cam member 67 of the second rotating plate 53 abuts against the top surface of the second lift plate 62 and is pushed up, and the second rotating plate 53 is raised gradually. As a result, as shown in FIG. 5B, both ends of the sushi rice R are raised with both ends of the base plate 51 as boundaries.

When the second lift plate 62 moves up further, the second lift plate 62 moves away from the cam roller 572, and the second lift plate 62 is raised to the uppermost position while being in contact with the next cam roller 573. As a result, the second rotating plate 53 becomes in an upright state with respect to the base plate 51.

Figure 5C:
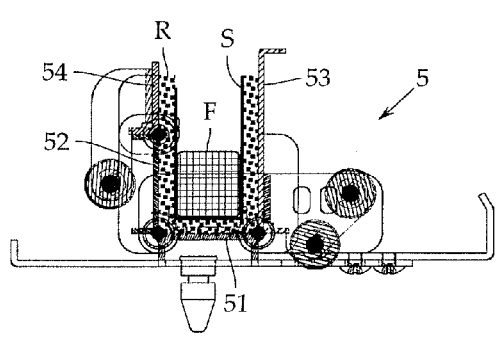

Thereby, as shown in FIG. 5C, the sushi rice R is arranged on both sides of the ingredients F so as to be held between the first rotating plate 52 and the second rotating plate 53.

When the first lift plate 61 further continues moving up and is raised to the uppermost position, the third rotating plate 54 is folded so as to be pushed into a space having a U-shaped cross section formed by the base plate 51, the first rotating plate 52 and the second rotating plate 53 (second pressing step).

Figure 5D:
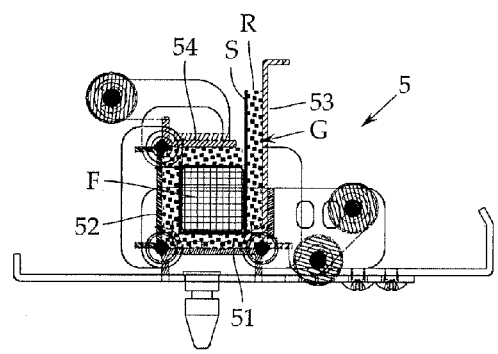

As a result, as shown in FIG. 5D, the sushi rice R placed on the rolling-up bamboo plate 5 is molded into a rod shape by being pressed from the upside by the third rotating plate 54. Also, the sushi rice R arranged on the second rotating plate 53 side is pulled out to the outside through the gap G formed between the second rotating plate 53 and the third rotating plate 54.

Figure 5E:
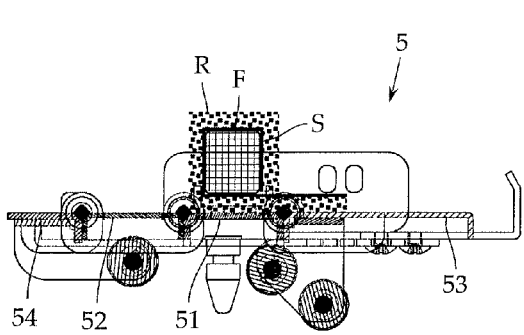

At this time, the control section returns the rolling-up bamboo plate 5 to the horizontal state once. As shown in FIG. 5E, in a deployed state, the operator rotates the molded sushi rice R through 90 degrees in the clockwise direction in FIG. 5E (repositioning step). Specifically, an edge of the cooked rice at a corner between the base plate and the second plate in the second pressing step is moved to a corner between the first plate and the base plate. The repositioning work for the sushi rice R may be performed automatically, not by hand.

Figure 5F:
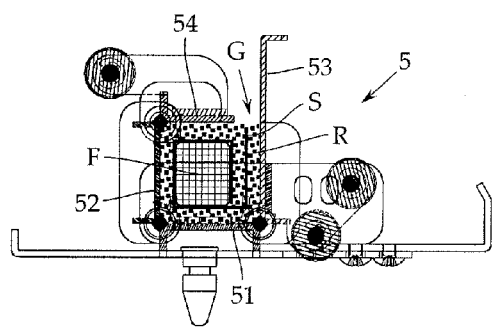

Finally, the rolling-up bamboo plate 5 is deformed into a tubular shape by repeating again the above-described series of operations, whereby as shown in FIG. 5F, the sushi rice R having not yet been molded is folded up and is folded in a spiral form (third pressing step). Thereby, back rolled sushi in which the sushi rice R is arranged on the surface side is molded. Thereafter, the control section deploys the rolling-up bamboo plate 5 and returns it to the initial position.

When the series of operations are finished, the cooked rice molding apparatus 1 comes to a standby condition again. Finally, the operator collects the back rolled sushi molded into a rod shape on the rolling-up bamboo plate 5, whereby the series of work steps are finished completely. A plurality of back rolled sushi can be made by repeating the above-described process. As a modification of this process, after the second pressing step, the final molding work may be performed by hand using a rolling-up bamboo mat.

In this embodiment, the cooked rice molding apparatus 1 rolls sushi rice in the rolling section 3, and molds the rolled sushi rice into a rod shape in the molding section 4. However, the cooked rice molding apparatus 1 may further include a ingredient charging device, a collecting device for automatically collecting the rolled-up sushi rice, and the like. These modifications are embraced in the present invention as far as the cooked rice molding apparatus of these modifications has the basic construction of the present invention. Also, the size of the rolling-up bamboo plate may be chosen optionally according to the size and diameter of the rolled sushi.

Furthermore, in this embodiment, the cooked rice molding apparatus has been explained by taking a molding apparatus that automatically performs a series of steps from the supply of cooked rice to the molding as an example. However, if the rolling-up bamboo plate structure of the present invention is provided, the configuration may consist of a single rolling-up bamboo plate only. Also, the driving method for the rolling-up bamboo plate may be automatic or manual. Such modes are also embraced in the present invention.

The invention claimed is:

1. A cooked rice molding method, comprising:
    a first supplying step of spreading cooked rice in a plate form on rolling-up plates deployed horizontally, said rolling-up plates having first, second, third and base plates rotatably connected to each other,
    a second supplying step of placing a dried layer sheet and ingredients on the cooked rice,
    a first pressing step of folding the first rotating plate and the second rotating plate disposed on two sides of the base plate in a direction such that the first and second rotating plates are brought close to each other to erect at approximate right angles with respect to the base plate,
    a second pressing step of folding the third rotating plate rotatably attached to the first rotating plate at a side opposite to the base plate, to a base plate side,
    a repositioning step of deploying the rolling-up plates in a horizontal state, and rotating the cooked rice molded in the second pressing step about 90 degrees on the rolling-up plates and moving an edge of the cooked rice at a corner between the base plate and the second plate in the second pressing step to a corner between the first plate and the base plate so that the cooked rice on the second rotating plate comes to a bottom side with respect to a rotational center of molding, and
    a third pressing step of performing the first pressing step again.

2. A cooked rice molding method according to claim 1, wherein the third rotating plate is formed to have a width narrower than that of the base plate.

3. A cooked rice molding method according to claim 2, wherein the second rotating plate is formed to have a width wider than that of the first rotating plate.

4. A cooked rice molding method according to claim 1, further comprising a fourth pressing step of folding the third rotating plate to the base plate side.

5. A cooked rice molding method according to claim 4, wherein the first, second and third pressing steps are made automatically by rotating the first, second and third plates.

6. A cooked rice molding method according to claim 4, wherein a portion of the cooked rice after the second pressing step forms a gap between the third rotating plate and the second rotating plate in the second pressing step.

7. A cooked rice molding method according to claim 6, wherein, in the fourth pressing step, the portion of the cooked rice overlaps with the cooked rice initially placed on the third rotating plate in the first supplying step.

8. A cooked rice molding method, comprising:
    a first supplying step of spreading cooked rice in a plate form on rolling-up plates deployed horizontally, said rolling-up plates having first, second, third and base plates rotatably connected to each other,
    a second supplying step of placing a dried layer sheet and ingredients on the cooked rice,
    a first pressing step of folding the first rotating plate and the second rotating plate disposed on two sides of the base plate in a direction such that the first and second rotating plates are brought close to each other to erect at approximate right angles with respect to the base plate, a second pressing step of folding the third rotating plate rotatably attached to the first rotating plate at a side opposite to the base plate, to a base plate side so that a part of cooked rice extends upwardly beyond the third rotating plate to form an extension, a repositioning step of deploying the rolling-up plates in a horizontal state, and rotating the cooked rice molded in the second pressing step about 90 degrees on the rolling-up plates so that a part of the cooked rice is located on the base plate and the extension of the cooked rice is located on the second rotating plate, and a third pressing step of performing the first pressing step again to fold the extension.

* * * * *